(12) United States Patent
Jaeger

(10) Patent No.: US 11,661,215 B2
(45) Date of Patent: May 30, 2023

(54) METHOD OF PROVIDING THERMAL BALANCE OF SATLET ELECTRONICS

(71) Applicant: NOVAWURKS, INC., Los Alamitos, CA (US)

(72) Inventor: Talbot Jaeger, Los Alamitos, CA (US)

(73) Assignee: NOVAWURKS, INC., Los Alamitos, CA (US)

( * ) Notice: Subject to any disclaimer, the term of this patent is extended or adjusted under 35 U.S.C. 154(b) by 179 days.

(21) Appl. No.: 16/518,018

(22) Filed: Jul. 22, 2019

(65) Prior Publication Data

US 2021/0086920 A1 Mar. 25, 2021

(51) Int. Cl.
| | |
|---|---|
| *B64G 1/58* | (2006.01) |
| *B64G 1/24* | (2006.01) |
| *B64G 1/40* | (2006.01) |
| *B64G 1/42* | (2006.01) |
| *G01K 1/02* | (2021.01) |
| *G01K 3/00* | (2006.01) |

(52) U.S. Cl.
CPC .............. *B64G 1/58* (2013.01); *B64G 1/242* (2013.01); *B64G 1/244* (2019.05); *B64G 1/402* (2013.01); *B64G 1/42* (2013.01); *G01K 1/026* (2013.01); *G01K 3/005* (2013.01)

(58) Field of Classification Search
CPC .......... B64G 1/58; B64G 1/244; B64G 1/242; B64G 1/402; B64G 1/42; B64G 1/64; B64G 2001/1092; B64G 1/50; G01K 1/026; G01K 3/005; G06F 1/20
See application file for complete search history.

(56) References Cited

U.S. PATENT DOCUMENTS

| | | | | |
|---|---|---|---|---|
| 5,779,195 | A | * | 7/1998 | Basuthakur ............ B64G 1/007 244/173.1 |
| 5,931,418 | A | | 8/1999 | Eller et al. |
| 5,954,298 | A | * | 9/1999 | Basuthakur .............. B64G 1/50 244/171.8 |
| 6,047,248 | A | | 4/2000 | Georgiou et al. |
| 6,206,327 | B1 | | 3/2001 | Benedetti et al. |

(Continued)

OTHER PUBLICATIONS

WO, PCT/US20/42346 ISR and Written Opinion, dated Oct. 7, 2020.

*Primary Examiner* — Assres H Woldemaryam
(74) *Attorney, Agent, or Firm* — One LLP

(57) ABSTRACT

A method for providing thermal balance of spacecraft electronics is provided. The spacecraft includes two or more electronic units wherein each electronic unit is capable of performing the same spacecraft operational task. The method for balancing the temperature of spacecraft electronics further includes providing each of the two or more electronic units with a temperature sensor for determining the temperature of that electronics unit. The electronic units and their respective temperature sensors are connected to a controller. In the event that the controller determines that the temperature of an activated first electronics unit has reached or exceeded a predetermined threshold, and the controller has determined that the temperature of a second deactivated electronics unit is below a predetermined threshold, the controller automatically deactivates the first electronics unit and activates the second electronics unit to perform the task previously being performed by the first electronics unit. This process continues automatically.

5 Claims, 7 Drawing Sheets

(56) References Cited

U.S. PATENT DOCUMENTS

| | | | | |
|---|---|---|---|---|
| 6,425,092 B1* | 7/2002 | Evans | ................... | G06F 1/206 |
| | | | | 714/13 |
| 6,568,638 B1 | 5/2003 | Capots | | |
| 7,506,185 B2 | 3/2009 | Lin | | |
| 9,231,323 B1* | 1/2016 | Jaeger | ................. | H01R 13/005 |
| 9,376,222 B2 | 6/2016 | Jaeger | | |
| 9,472,915 B1* | 10/2016 | Jaeger | ................. | H01R 39/643 |
| 2009/0177919 A1 | 7/2009 | Bose et al. | | |
| 2016/0033941 A1 | 2/2016 | T et al. | | |
| 2016/0130019 A1* | 5/2016 | Jaeger | ................... | B64G 1/402 |
| | | | | 62/7 |
| 2016/0236801 A1* | 8/2016 | Jaeger | ................... | B64G 1/425 |

* cited by examiner

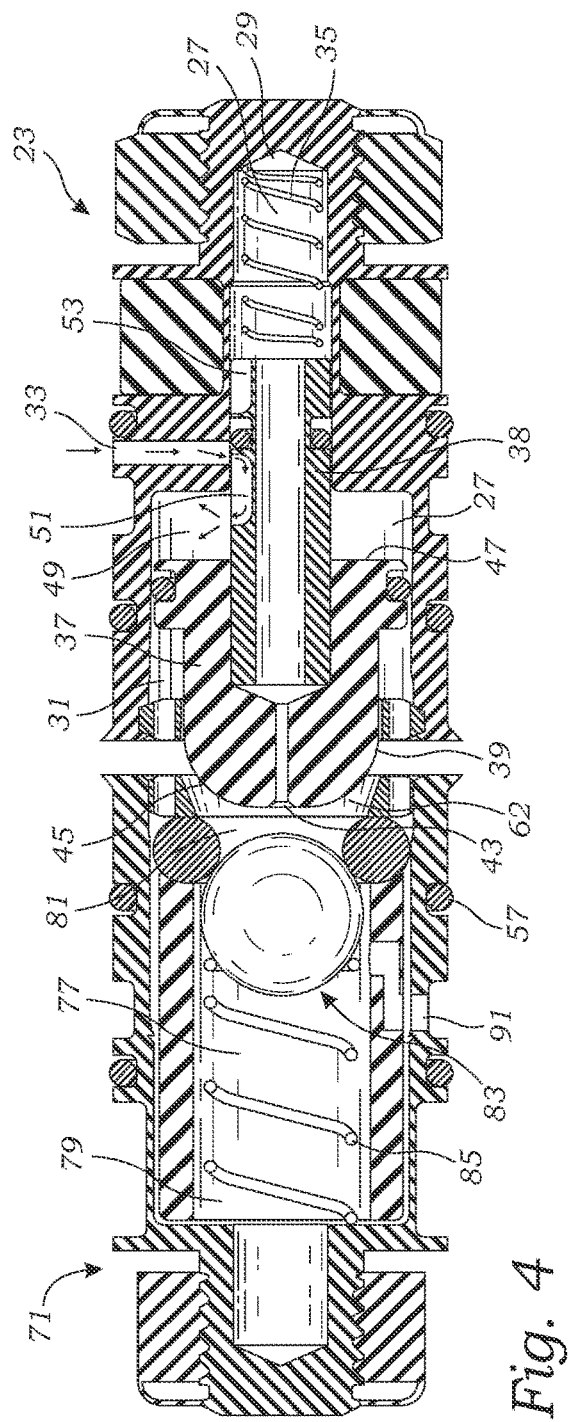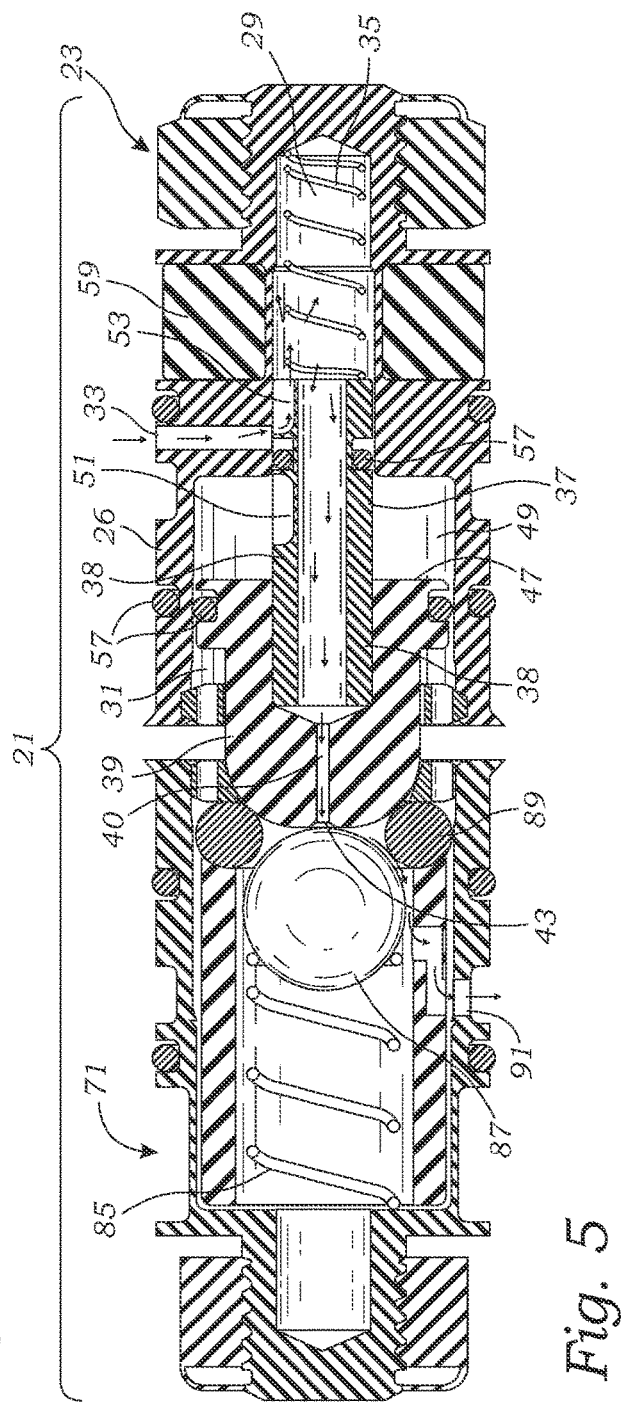

METHOD OF PROVIDING THERMAL BALANCE OF SATLET ELECTRONICS

This invention was made with government support under contract no. HR0011-14-C-0023 awarded by the Defense Advanced Research Projects Agency. The government has certain rights in the invention.

BACKGROUND OF THE INVENTION

The present invention relates generally to spacecraft engineering and design. More particularly, the present invention relates to thermal control of spacecraft and the thermal balance of its electronic components.

Thermal control of a spacecraft is an important issue as spacecraft electrical components must be kept within acceptable temperature ranges. For example, thermal control of the spacecraft is important to ensure that the spacecraft's electronics are not damaged and are performing optimally. Batteries are particularly susceptible to cyclic thermal damage which can limit useful life of a spacecraft. Additional electronics, such as optical sensors and atomic clocks, also require increased temperature stability.

Unfortunately, spacecraft components must cope with the external environment, typically from the Earth and sun. For example, in low earth orbit (LEO), spacecraft encounter significant infrared emissions, short orbital periods, and long eclipse durations. This can cause problems for sensors and other electronics that can be affected by a continuously changing thermal environment. Spacecraft in geostationary orbit (GEO) encounter different thermal concerns. Spacecraft in GEO do not encounter much effect from the Earth's radiation. However, the longer 24 hour orbit causes a spacecraft to encounter long eclipses and longer periods of exposure to the sun's radiation which must be addressed in the spacecraft design. Spacecraft in highly eccentric orbits (HEO) and in deep space encounter thermal environments even more severe.

In addition, the spacecraft must address heat created internally by the electronic components. This has resulted in the size of the spacecraft being dictated by the amount of heat that needs to be dissipated as an increase in heat that is created by the spacecraft's electronics translates into the need for increased spacecraft surface area to dissipate the heat. Unfortunately, increased spacecraft size typically leads to increased costs.

To provide thermal control, spacecraft have employed both passive and active thermal systems. Passive systems include: surface radiators which must be located on external surfaces; single or multi-layer insulation which protect against excess external induced heating as well as excess cooling; coatings which change the thermo-optical properties of exposed surfaces; thermal coupling fillers and thermal insulators for altering the paths of thermal transfer; and mirrors for rejecting external radiation and absorption of solar flares. Meanwhile, active thermal control systems include electric heaters and thermoelectric coolers. Additional active thermal control systems include fluid loop assemblies, which may be controlled by a pump or may be composed of heat pipes, to transfer heat from internal electronic components to external radiators. Also, active thermal control systems have utilized the spacecraft's propellant to cool the spacecraft's electronics. For example, U.S. Pat. No. 5,954,298 describes a fluid piping system that transports propellant to electronic components that require cooling. U.S. Pat. No. 9,376,222 describes spacecraft where the electronic components are placed upon or within the spacecraft's propellant tanks to provide thermal coupling of the electronics with the propellant.

All of these thermal control systems, both passive and active, increase spacecraft weight, complexity and cost. Moreover, spacecraft thermal control systems consume the external surface area of a spacecraft for heat dissipation which could be used to support payload components. Further, the active thermal control systems, such as to thermoelectric heaters and coolers, consume electrical power which could be used to operate payload components.

Recently, spacecraft have been designed by combining homogeneous cells, also referred to herein as satlets. The term "satlet" refers to a cell of a cell-based spacecraft where each satlet possesses the traditional architecture of a spacecraft including structure, power, fuel, attitude control and determination, spacecraft processing, etc. Thus, each satlet has its own frame that supports multiple spacecraft subsystems including solar panels, batteries, one or more actuator wheels (functioning as a momentum wheel and/or reaction wheel), image sensors, thermal control systems, propulsion system including a fuel tank and thrusters, and electronics for command and data handling, data sharing, attitude control, and position control. Preferably, each satlet is substantially identical so as to be manufactured inexpensively and quickly. The satlets are aggregated together to form a single spacecraft which can seriously increase performance with increased numbers to support payload functions, such as communications and surveillance. Each satlet includes one or more electronic components for data processing and spacecraft control. These electronic components produce heat resulting in the need for thermal control. In current spacecraft, heat pipes and external radiators have been used to cool the electronic components. However, the smaller surface area and volume of satlets are not ideal for including heat pipes and external radiators.

Thus, it would be desirable to provide an improved method of providing improved thermal control over spacecraft electronics.

Moreover, it would be desirable to provide an improved method of providing thermal balance of spacecraft electronics that does not require heavy and voluminous heat pipes and radiators.

SUMMARY OF THE INVENTION

A method for balancing the temperature of spacecraft electronics is provided. The spacecraft includes two separate electronic units with each capable of performing the same spacecraft operational task. "Separate electronic units" means that the electronics are located in different housings or a physically separated by distance or insulation such that those skilled in the art would understand that the electronic units are not thermally coupled or encounter little thermal transfer between the two. Where the spacecraft is comprised of a plurality of satlets, each satlet is considered a separate electronics unit. The term "capable of performing the same spacecraft operational task" means that either unit is capable of performing a required spacecraft task while the other unit is deactivated. Examples of "separate electronic units capable of performing the same spacecraft task" include a first electronics unit which provides attitude control (ACE), station keeping also known as position control, telemetry, sensor capability (such as sun sensor and star tracker), and/or payload management, etc. and a second electronic unit located on the opposite side of the spacecraft that provides the same function of attitude control (ACE), station keeping also known as position control, telemetry, sensor capability (such as sun sensor and star tracker), and/or payload management, etc. Additional "separate electronic units capable of performing the same spacecraft task" include two reaction wheels rotating about same axis located at different places on the spacecraft. Two reaction wheels rotating about different axis would not be considered "separate electronic units capable of performing the same spacecraft task" because they do not perform the same function.

The method for balancing the temperature of spacecraft electronics further includes providing each of the two electronic units with a temperature sensor for determining the temperature of that electronics unit. Each of the temperature sensors may be affixed, and thus thermally coupled to an electronic unit's housing. Alternatively, each of the temperature sensors may be affixed to the electronic unit's printed circuit board, or most preferably, each of the temperature sensors is surface mounted to the electronic unit's printed circuit board.

The first and second electronic units and their respective temperature sensors are connected to a controller. The controller is a traditional computer processor which receives and monitors the temperature sensor data. In addition, the controller automatically controls the activation and deactivation of the first and second electronics units.

In operation, in the event that the controller determines that the temperature of an activated first electronics unit has reached or exceeded a predetermined threshold, and determines that the temperature of a second deactivated electronics unit is below a predetermined threshold, the controller automatically deactivates the first electronics unit and activates the second electronics unit to perform the spacecraft function previously performed by the first electronics unit.

This process continues automatically. Once the second electronics unit has been activated, its temperature is monitored by the controller. In the event that its temperature has reached or exceeded a predetermined threshold and the controller has determined that the temperature of another electronics unit is below a predetermined threshold, the controller deactivates the second electronics unit and activates an alternative electronic unit which has a temperature below the predetermined threshold. The newly activated unit may be the first electronics unit that was previously deactivated, or the controller may activate a third electronics unit capable of performing the same spacecraft task as the first and second electronics units.

This method of providing thermal control of the spacecraft electronics is believed to have particular application to spacecraft constructed of a plurality of satlets. With each satlet possessing all of a traditional spacecraft subsystems (including batteries, one or more actuator wheels, image sensors, and electronics for command and data handling, data sharing, attitude control, and position control), the spacecraft has ideal capability to switch spacecraft operations from the electronics units of a first satlet to a second satlet, and then to a third and fourth satlet, etc., etc.

In addition, this method of providing thermal control of a spacecraft electronics is believed to have application to traditional "non-satlet" spacecraft wherein each spacecraft subsystem (including actuator wheels, image sensors, and electronics for command and data handling, payload management, data sharing, attitude control, and position control) is assembled in a pair of boxes (typically metal) including a first primary electronics unit and a redundant second electronics unit. Previously, the primary unit was operated continuously in space, and the redundant unit was deactivated. The primary unit operated at all times unless there was a failure of the primary unit. In the event of a primary unit failure, the primary unit was deactivated (typically forever) and the redundant unit was activated. This practice is believed to have continued due to the fear that activating and deactivating an electronics unit might trigger a unit failure. However, this practice required the increased weight, complexity and cost of passive and active spacecraft thermal control systems to maintain the appropriate temperature range for an electronics unit operating 100% of the time.

Conversely, the thermal control method described herein does not require a primary unit and a redundant unit. Instead, each of the spacecraft's two or more electronics unit (capable of performing the same spacecraft task) is considered a primary unit which is activated and/or deactivated based on temperature constraints. This reduces the need for passive and active spacecraft thermal control systems.

Advantageously, it is an object to provide an improved system of thermal control of traditional spacecraft and spacecraft comprised of satlets.

It is an additional object of the present invention to provide thermal control of traditional spacecraft and spacecraft comprised of satlets without voluminous heat pipes and radiators.

Other features and advantages of the present invention will be appreciated by those skilled in the art upon reading the detailed description which follows with reference to the attached drawings.

BRIEF DESCRIPTION OF THE DRAWINGS

FIG. 4 is a side cut-away view of the male and female valve assemblies of the interface connector used to connect satlets to form a preferred spacecraft wherein the male valve assembly piston is being actuated from a soft dock condition to an extended locking condition;

FIG. 5 is a side cut-away view of the male and female valve assemblies of the interface connector used to connect satlets to form a preferred spacecraft wherein the male valve assembly piston has been extended so as to lock male and female valve assemblies together;

DETAILED DESCRIPTION OF THE PREFERRED EMBODIMENTS

Figure 1:
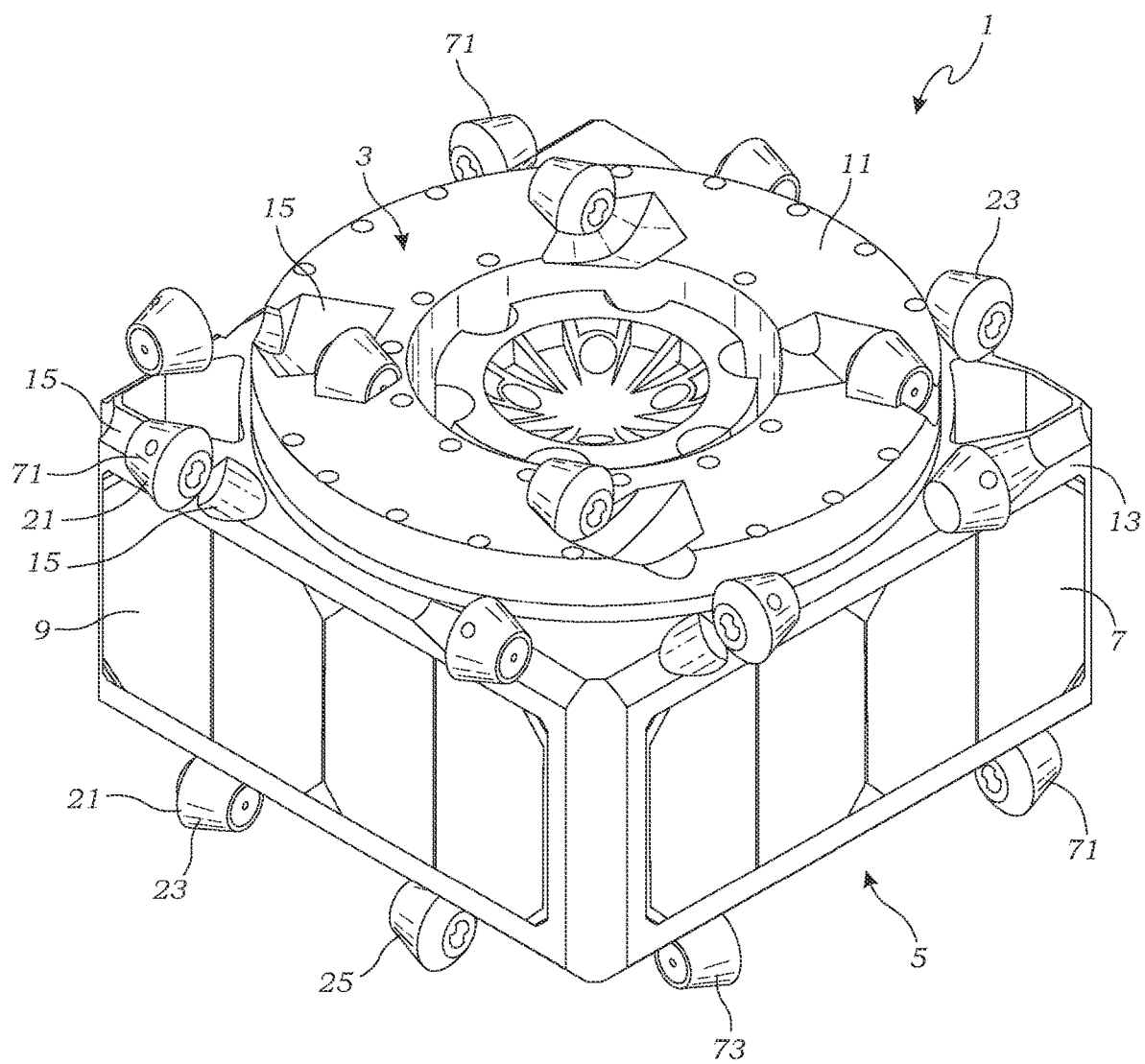
FIG. 1 is a perspective view of a satlet incorporating traditional spacecraft architecture.

While the present invention is susceptible of embodiment in various forms, as shown in the drawings, hereinafter will be described the presently preferred embodiments of the invention with the understanding that the present disclosure is to be considered as an exemplification of the invention, and it is not intended to limit the invention to the specific embodiments illustrated.

Figure 2:
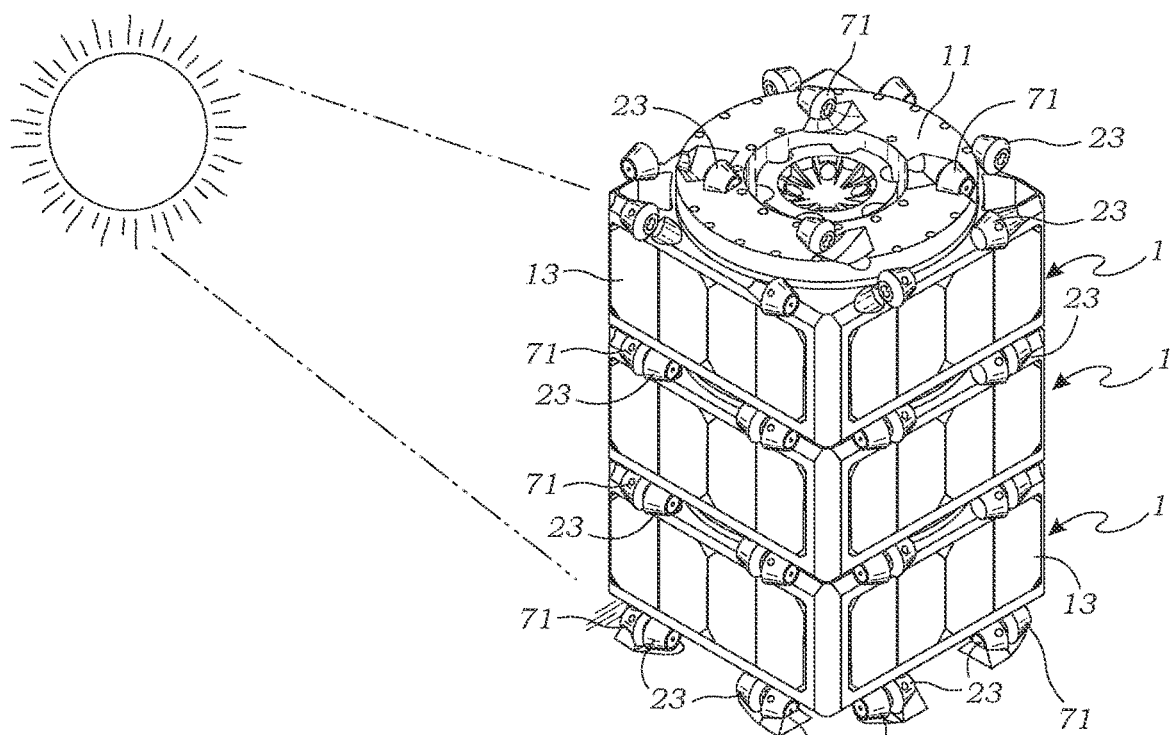
FIG. 2 is a perspective view of a spacecraft comprised of three (3) satlets in a stacked condition which is encountering radiation from the sun.
Figure 3:
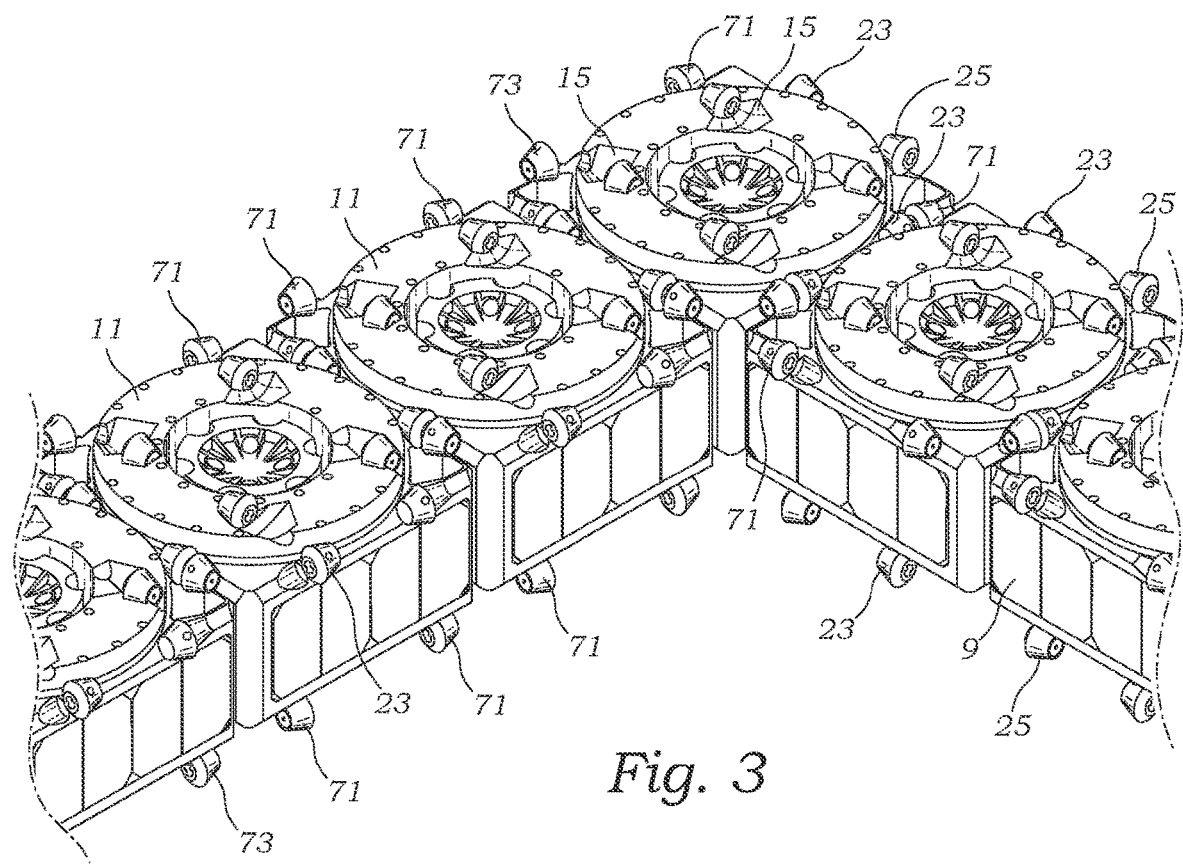
FIG. 3 is a top perspective view of a spacecraft comprised of six (6) satlets connected side-by-side.
Figure 6:
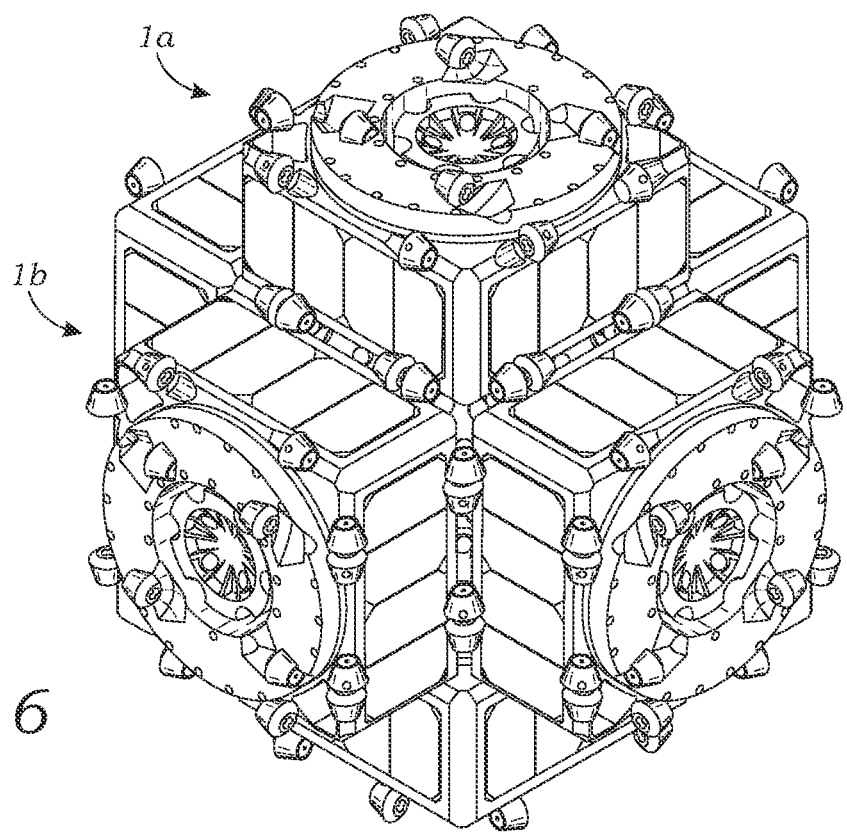
FIG. 6 is a perspective view of a spacecraft comprised of six (6) satlets.

As illustrated in FIGS. 1-9, the method of balancing the temperature of spacecraft's electronics can be implemented within any spacecraft having two or more electronics units capable of performing the same operational task. However, though not intended to be limited, the spacecraft is ideally constructed to include a plurality of satlets 1 integrated to form a spacecraft. As illustrated in FIGS. 1-3 a preferred satlet 1 has a top 3, a bottom 5, and four sides 7. Furthermore, each satlet 1 includes its own housing 13 that supports multiple spacecraft subsystems including solar panels 9, batteries, one or more actuator wheels (functioning as a momentum wheel and/or reaction wheel), image sensors, thermal control systems, propulsion system including a fuel tank 81 and thrusters, and electronics (including one or more computer processors) 82 for command and data handling, data sharing, attitude control, and position control.

The aggregated satlets 1 may be connected structurally and connected for fluid, power and data transfer by various connectors as can be determined by those skilled in the art. However, with reference particularly to FIGS. 4-7, in preferred embodiments, the satlets 1 are connected by an interface connector 21 having particular usefulness in structurally and electrically connecting satlets 1. In addition to providing a structural connection, with reference to FIGS. 5 and 9, the interface connector 21 is capable of transmitting power and data between adjoining satlets 1.

Though alternative interface connectors may be employed to connect satlets and provide the necessary power and data transfer capabilities to balance the temperature of the spacecraft electronics, a preferred interface connector includes a male valve assembly 23 and a female valve assembly 71. As best illustrated in FIGS. 1-3, the male valve assembly 23 has a tapered housing 25. As illustrated in FIGS. 4-5, the male valve assembly 23 includes a central bore 27. Preferably, the cylindrical bore has a circular cross-section. As illustrated in the figures, the central bore has a smaller diameter towards its proximal end 29 and a larger diameter at its distal end 31. Furthermore, the male valve assembly's central bore is connected to a fuel source such as by a fuel line 33 which radially projects through the valve assembly's housing towards the central bore's proximal end. Preferably, the fuel source is a fuel tank 84.

The male valve assembly 23 also includes a piston 37. As illustrated in the figures, a preferred piston is manufactured to include two components including a smaller diameter shaft 38 and a larger diameter piston head 39. Preferably, the piston head 39 has a diameter sufficiently large to form a substantially gaseous-tight seal within the central bore 27. Furthermore, the piston may include an O-ring concentrically positioned around the piston head to form a gaseous-tight seal between the piston head and the cylindrical surface of the central bore 27. Advantageously, the difference in diameter between the piston's shaft 38 and piston head 39 provides the piston head with a circular collar region 47. The smaller diameter shaft 38 slidably resides within the smaller proximal end 29 of the central bore 27. Meanwhile, the larger diameter piston head 39 slidably resides in the larger distal end 31 of the central bore 27. The piston 37 includes a central conduit 40 which extends the entire length of the piston through the shaft 38 and piston head 39. Preferably, the piston head 39 includes a divergent nozzle 43 forming the distal end of the central conduit 40.

The male valve assembly's piston 37 is capable of moving proximally and distally within the central bore 27. Movement of the piston can be actuated by various electrical or mechanical apparatus known to those skilled in the art. Applicant's preferred interface connector 21 includes a piston which is projected distally using pneumatic actuation, but moved proximally using an electromagnetic actuator. Moreover, it is preferred that the piston be maintained in a neutral central position by a helical spring 35 when not actuated proximally or distally.

To enable the piston 37 to be pneumatically extended, the piston shaft 38 has a first channel 51 which extends from the fuel line 33 into a chamber 49 formed behind the piston's collar 47 when the piston is in a neutral "soft dock" position. As illustrated in FIG. 4, the release of propellant through the fuel line 33, such as by opening a fuel valve (not shown), allows propellant to flow through the first channel 51 into chamber 49 so as to pneumatically force the piston distally. As illustrated in FIG. 5, the piston is forced distally until the first channel 51 is no longer in fluid communication with the fuel line 33. Preferably an O-ring 57 is provided to provide a fluid tight seal so as to prevent further propellant passing through the first channel 51 into chamber 49.

As illustrated in FIGS. 4-5, preferably the piston shaft 38 further includes a second channel 53 which comes into fluid communication with the fuel line 33 when the piston has been extended to a distal position. As illustrated in FIG. 5, the second channel 53 connects the fuel line 33 with the male valve assembly's central bore 27 at the central bore's proximal end 29 so as to allow propellant to flow through the fuel line into the central bore 27, and thereafter through the piston's central conduit 40, so as to be ejected from the piston's distal end 43.

To move the piston 37 in the proximal direction, the male valve assembly 23 includes a magnetic actuator including an electrical magnetic field generator, such as a coil winding 59 concentrically positioned around the piston's shaft 38. As understood by those skilled in the art, incorporating magnetic properties into the shaft 38 in cooperation with a controllable electromagnetic field provided by the magnetic field actuator 59 will cause the piston 37 to move in the proximal direction.

As illustrated in each of the figures, the interface connector 21 also includes a female valve assembly 71 intended to connect with the male valve assembly 23. The female valve assembly 71 includes a tapered housing 73 which is also sized to be received and aligned within beveled recesses 15 formed within a satlet's housing 13.

As illustrated in FIGS. 4 and 5, the female valve assembly includes a central bore 77 having a proximal end 79 and a distal end 81. The distal end is closeable by a ball valve 83. The ball valve includes a ball 87, an O-ring 89 having an inner diameter smaller than the diameter of the ball, and a helical spring 85 for biasing the ball distally into the O-ring for creating a fluid tight seal. As understood by those skilled in the art, the helical spring 85 maintains the ball valve in a normally closed condition. However, movement of the ball 87 in the proximal direction, such as by engagement by a male valve assembly piston 37, will cause the ball valve to open. The female valve assembly further includes a fuel line 91 so that the female valve assembly's central bore 77 is connected to a fuel source (not shown). Preferably, the fuel source is a fuel tank 84.

In a preferred embodiment, the interface connector 21 includes two sets of male and female valve assemblies. As illustrated in FIGS. 1-3, for this embodiment, the first and second male valve assemblies 23 are mounted, for example to a first satlet housing 13, in an outwardly facing coaxially aligned relationship to one another. More specifically, each male valve assembly's central bore 27 and piston 37 share the same axis and the male valve assemblies are mounted so that each piston extends outward from one another and each piston retracts toward each other. Meanwhile, the female valve assemblies are mounted to a second satlet housing in a manner wherein the female valve assemblies' central bores are also coaxially aligned. However, the female valve assemblies are positioned to be inwardly facing, and aligned and spaced so as to connect with two male valve assemblies.

Figure 7:
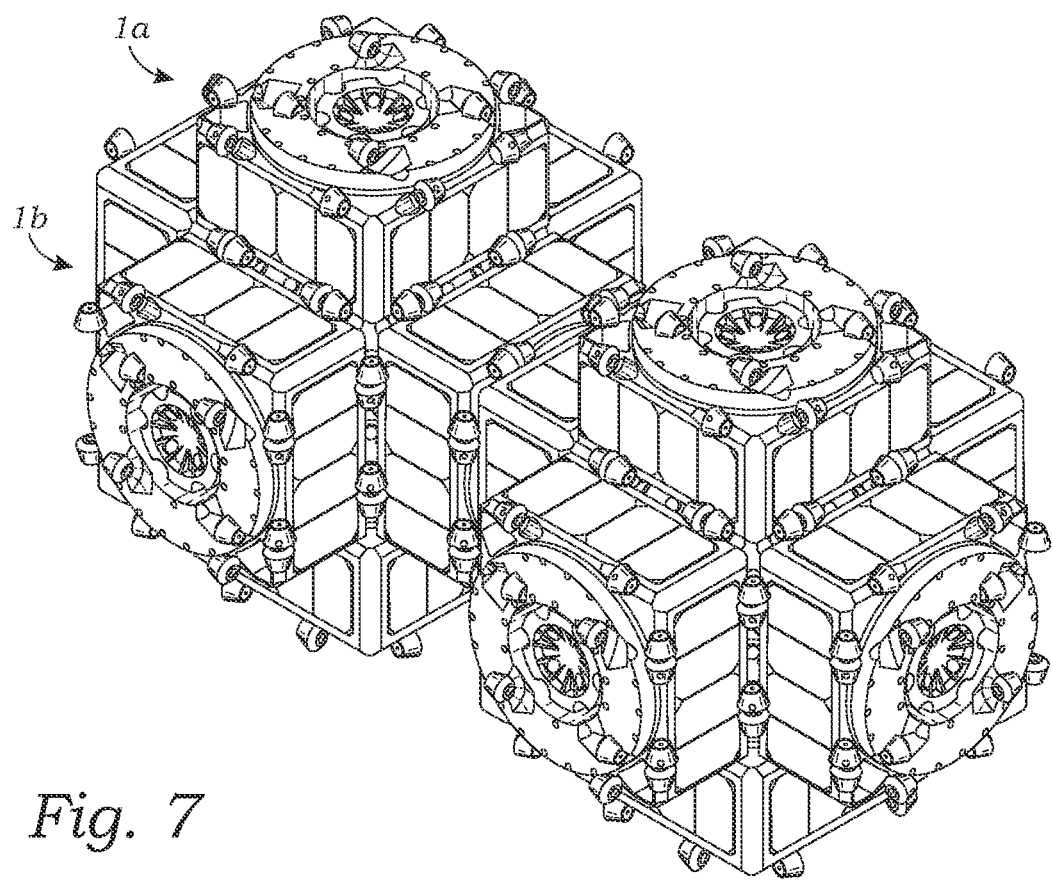
FIG. 7 is a perspective view of a spacecraft comprised of twelve (12) satlets.

FIG. 4 illustrates a soft dock connection between a male valve assembly 23 and a female valve assembly 71. The male valve assembly's piston is maintained in a neutral condition by the spring 35. The male piston 37 projects partially into the female valve assembly's receptacle 62, but the piston is not extended so far as to engage the female valve assembly's O-ring 89 so as to form a fluid tight seal. Without introduction of a gas, such as a propellant, into the male valve assembly's chamber 49, the piston 37 can be displaced proximally relatively easily so as to allow engagement or disengagement of the male valve assembly to the female valve assembly. However, as illustrated in FIGS. 5 and 7, the introduction of propellant from fuel line 33 through first channel 51 into the male valve assembly's chamber 49 causes the piston 37 to move distally into the female valve assembly's receptacle 62 so as to engage and form a fluid tight seal with the female valve assembly's O-ring 89. Though not illustrated in the Figures, the piston conduit's distal end has a lateral slit across the divergent nozzle 43 so as to prevent a fluid tight seal between the piston's conduit 40 and the female valve assembly's ball 87. Thus, as illustrated in FIG. 5, when the male valve assembly piston has been moved to a distal "hard dock" position, gas is freely capable of flowing through the male and female valve assemblies, as controlled by a valve connected to the male valve assembly's fuel line 33. As would be understood by those skilled in the art, the opening of this valve causes propellant to flow from the high-pressure region in either the first or second satlet, to the low-pressure region in the first or second satlet. Furthermore, preferably the controller may control the propellant to flow from the first satlet to the second satlet, or from the second satlet to the first satlet.

To enable the transfer of power and data between satlets, the female valve assembly's insert portion 75 of housing 73, helical spring 85, and ball 87 are electrically conductive. Conversely, it is preferred that the male valve assembly's insert portion 26 of housing 25, piston 37 and helical spring 35 be electrically conductive. Movement of the piston 37 to a distal position to engage ball 87 provides an electrical connection through the male and female valve assemblies so as to permit the transmission of power between the satlets 1, and the transfer of data between the satlet electronics 82.

Figure 8:
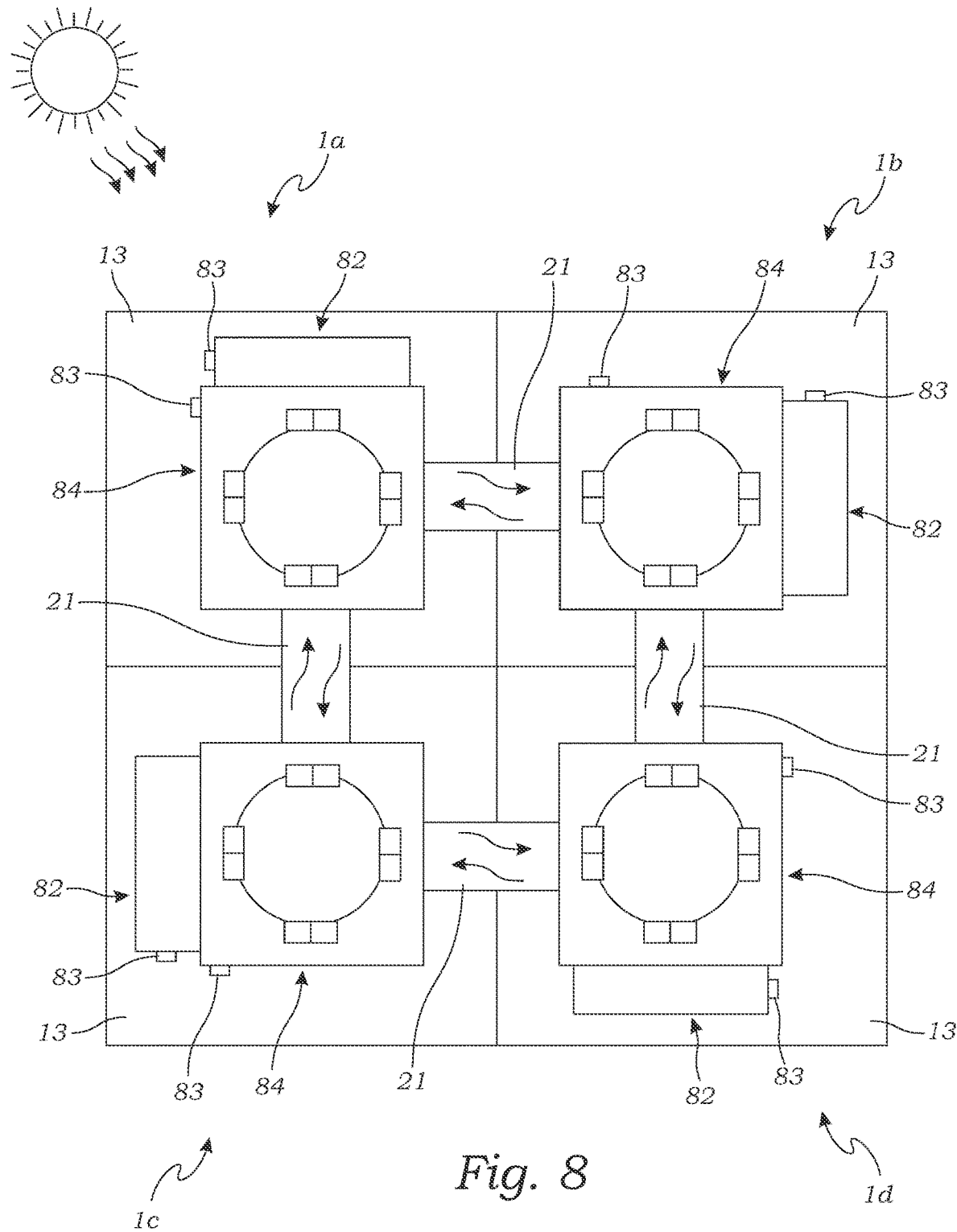
FIG. 8 is a diagram illustrating four (4) satlets connected together.
Figure 9:
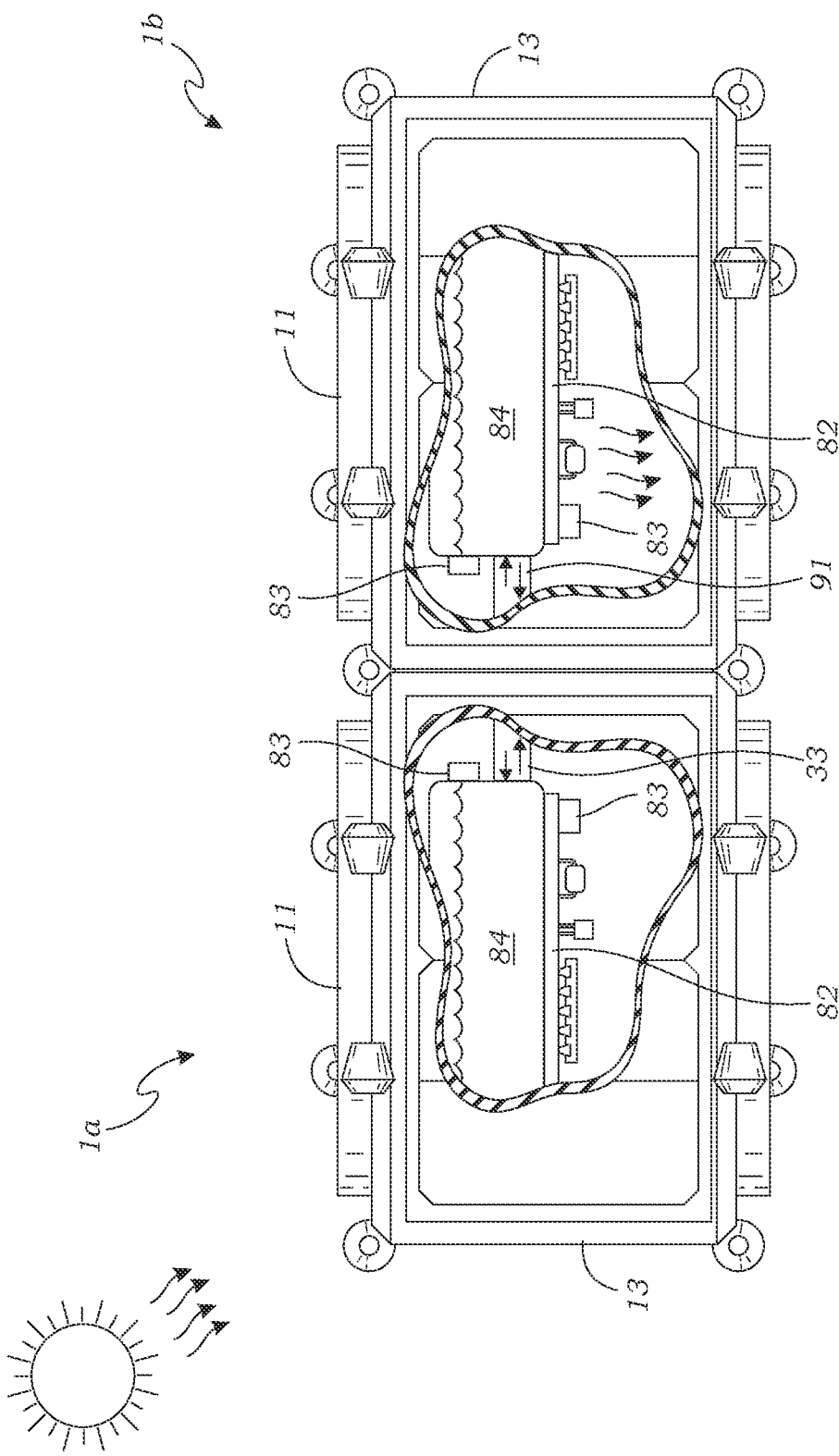
FIG. 9 is a side cut-away view of the sun irradiating two (2) satlets connected side-by-side illustrating the sun-side satlet 1a having electronics that are overheating.

In addition to the satlet's being structurally and electrically connected, as illustrated in FIGS. 8 and 9, preferably the satlet's 1 fuel tanks 81 are connected by fuel lines (33 or 91) and fluid connectors 21 so as to allow propellants to flow from one satlet to another. With reference also to FIGS. 1-7, the satlets further include open and closable valves (23 and 71) for permitting or obstructing the flow of propellant from one satlet to another. The satlets may contain pumps (not shown) to affect the transfer of propellant from one satlet to another. Alternatively, the opening of one or more valves may cause the propellant to flow from a high-pressure region in either the first or second satlet to a low-pressure region in an alternate satlet.

With reference to FIGS. 8 and 9, in a preferred embodiment, the satlets have one or more temperature sensors 83 for determining the temperature or each satlet's electronics 82 and propellant within each satlet's fuel tank 84, and in preferred embodiments, temperature sensors 83 are surface mounted to the electronics unit's printed circuit boards. The electronic unit 82 of each satlet and their respective temperature sensor 83 is connected to a controller. The controller may be a general-purpose computer or microprocessor including hardware and software as can be determined by those skilled in the art to provide automated or directed control of the fuel valves so as to open and close the valves to thereby control the flow of fuel from one satlet to another. The controller may be located within the electronics 82 of a single satlet 1, within the aggregate processing of the electronics 82 of two or more satlets, or at a remote location such as on the Earth at a control station.

Figure 10:
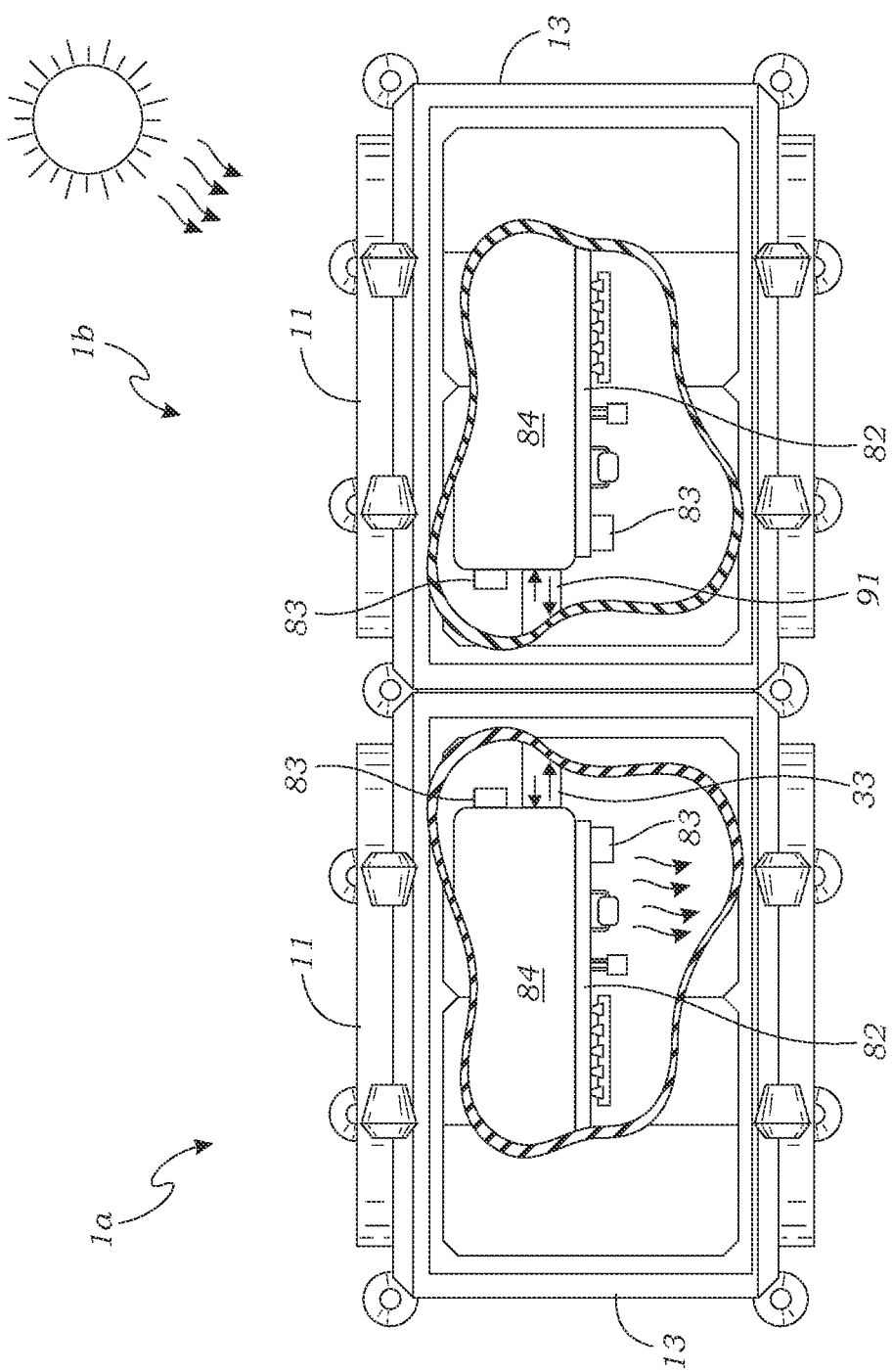
FIG. 10 is a side cut-away view of the sun irradiating two (2) satlets connected side-by-side shown in FIG. 9 after the sun-side electronics unit has been deactivated and the sun shielded satlet's electronics unit has been activated.

In operation, the controller is connected to the temperature sensors 83 for determining if the temperature of a satlet's electronics 82 has reached or exceeds a predetermined threshold, or that the temperatures of the electronics of two connected satlets are unequal. For example, as illustrated in FIG. 2, the satlets with more exposure to the sun will have a higher temperature than a satlet with less exposure to the sun. In the event that the controller determines that the temperature of an activated first electronics unit has reached or exceeded a predetermined threshold, and determined that the temperature of a second deactivated electronics unit is below a predetermined threshold, the controller automatically deactivates the first electronics unit and activates the second electronics unit to perform the operational task previously being performed by the first electronics unit. For example, with reference to FIG. 9, the sun's radiation upon first satlet 1a may cause the temperature of its electronics unit 82 to reach or exceed a predetermined threshold. The temperature of the first satlet's electronic unit 82 will be detected and transmitted to the controller by the unit's temperature sensor 83. The controller will then deactivate the first satlet's electronic unit 82 within satlet 1a and transfer its spacecraft functions to the electronic unit of another satlet, such as satlet 1b which is not facing the sun. As the spacecraft rotates relative to the sun, as illustrate in FIG. 10, it is anticipated that the temperature of the second electronic unit 82 will increase as the sun's radiation strikes the surface of satlet 1b. The controller will then deactivate the electronic unit 82 within satlet 1b and transfer its spacecraft functions to the electronics unit 82 of another satlet, such as to the electronics unit within satlet 1a which is now not facing the sun as illustrated in FIG. 10, or to the electronics unit 82 within a third satlet 1c, as illustrated in 8.

This process continues automatically. Once the second electronics unit 82 on the second satlet 1b has been activated, its temperature is monitored by the controller. In the event that its temperature has reached or exceeded a predetermined threshold and the controller has determined that the temperature of another electronics unit is below a predetermined threshold, the controller deactivates the second electronics unit and activates the electronic unit which has a temperature below the predetermined threshold. The change in temperature result from the heat produced by the electronics unit, or may result from rotation of the spacecraft relative to the sun. For example, as illustrated in FIG. 8, the activation and deactivation of electronic units 82 may rotate about the spacecraft as the spacecraft rotates relative to the sun, or as the spacecraft encounters alternating direct sunlight and eclipses of the sun.

Though not necessary, in a preferred embodiment, the method of balancing the temperature of the spacecraft electronics includes supplemental cooling the of the electronics by utilizing the spacecraft's propellant as described in U.S. Pat. No. 9,376,222 which is incorporated by reference in its entirety herein. For this embodiment and with reference to FIGS. 8 and 9, in a preferred embodiment, the satlets 1 have additional temperature sensors 83 for determining the temperature of the propellant within each satlet's fuel tank 84. In operation, the controller is capable of directing the flow of propellant from a satlet with a cooler propellant to the satlet having electronics which are operating at higher temperature levels.

Advantageously, the aggregation of the satlets 1 using the interface connectors 21 allows for the controllable flow of propellant from the first satlet to the second satlet, or from the second satlet to the first satlet to control the temperature of the satlets' electronics. Furthermore, where the spacecraft is constructed of three or more satlets, the controller can direct propellant throughout the spacecraft architecture to maintain thermal control of the electronics within each of the individual satlets. By combining the thermal control techniques of: 1) continuously transferring the spacecraft's operations to cooler electronic units, and 2) moving cooler propellant to higher temperature electronics units, the spacecraft architecture can reduce the need for more traditional active and passive thermal control systems.

While several particular forms of the invention have been illustrated and described, it will be apparent that various modifications can be made without departing from the spirit and scope of the invention. Therefore, it is not intended that the invention be limited except by the following claims.

Having described my invention in such terms so as to enable persons skilled in the art to understand the invention, recreate the invention and practice it, and having presently identified the presently preferred embodiments thereof I claim:

1. A method for controlling the temperature of spacecraft electronics comprising the steps of:
   providing a spacecraft which includes a first electronics unit capable of performing a spacecraft operational task, the first electronics unit including a first housing and first electronic components for performing the spacecraft operational task which are mounted on a first printed circuit board positioned within the first housing, and the spacecraft including a second electronics unit capable of performing the same spacecraft operational task as the first electronics unit, the second electronics unit including a second housing and second electronic components for performing the spacecraft operational task which are mounted on a second printed circuit board positioned within said second housing;
   providing the spacecraft with a first temperature sensor located within said first housing for determining the temperature of the first electronic components and a second temperature sensor located within said second housing for determining the temperature of the second electronic components;
   providing a controller that is connected to the first electronic components on said first printed circuit board and said second electronic components on said second printed circuit board and to the first and second temperature sensors, said controller capable of selectively activating or deactivating the first electronic components on said first printed circuit board and said second electronic components on said second printed circuit board;
   activating the first electronic components to perform its spacecraft operational task while simultaneously deactivating the second electronic components;
   determining, by the controller, that the temperature of the first electronic components have has reached or exceeded a predetermined threshold;
   determining, by the controller, that the temperature of the second electronic components is lower than a predetermined threshold; and
   automatically deactivating the first electronic components of the first electronics unit while simultaneously activating the second electronic components of the second electronics unit to perform the spacecraft operational task previously being performed by the first electronics unit, by the controller, in the event that the controller has determined that the temperature of the first electronic components has reached or exceeds a predetermined threshold and that the temperature of the second electronic components is lower than a predetermined threshold.

2. The method for controlling the temperature of spacecraft electronics of claim 1 wherein said first electronics unit is a first satlet which includes a first propellant within said first housing and said first electronic components are positioned within said first propellant, and wherein said second electronics unit is a second satlet which includes a second propellant within said second housing and said second electronic components are positioned within said second propellant.

3. The method for controlling the temperature of satlet electronics of claim 2 further comprising the steps of:
   providing the spacecraft with a third satlet in the form of a third electronics unit which includes a third housing and third electronic components for performing the spacecraft operational task mounted on a third printed circuit board within said third housing, and providing the spacecraft with a third temperature sensor for determining the temperature of the third electronic components, the third electronic components and third temperature sensor connected to the controller;
   determining, by the controller, that the temperature of the second electronic components has reached or exceeded a predetermined threshold;
   determining, by the controller, that the temperature of the third electronic components is lower than a predetermined threshold; and
   automatically deactivating the second electronic components and activating the third electronic components, by the controller, in the event that the controller had determined that the temperature of the second electronic components has reached or exceeds a predetermined threshold and that the temperature of the third electronic components is lower than a predetermined threshold.

4. The method for controlling the temperature of spacecraft electronics of claim 1 wherein the spacecraft operational task is attitude control.

5. The method for controlling the temperature of spacecraft electronics of claim 1 wherein the spacecraft operational task is station keeping (also known as position control).

* * * * *